United States Patent
Himeno et al.

(10) Patent No.: US 7,101,408 B2
(45) Date of Patent: Sep. 5, 2006

(54) DISPERSE DYE MIXTURES

(75) Inventors: Kiyoshi Himeno, Cheadle Cheshire (GB); Shinsuke Ohno, Cheadle Cheshire (GB)

(73) Assignee: DyStar Textilfarben GmbH & Co. Deutschland KG, (DE)

( * ) Notice: Subject to any disclaimer, the term of this patent is extended or adjusted under 35 U.S.C. 154(b) by 244 days.

(21) Appl. No.: 10/834,428

(22) Filed: Apr. 29, 2004

(65) Prior Publication Data
US 2004/0226112 A1 Nov. 18, 2004

Related U.S. Application Data

(60) Provisional application No. 60/470,314, filed on May 14, 2003.

(51) Int. Cl.
*D06P 3/54* (2006.01)
*C09B 67/38* (2006.01)
(52) U.S. Cl. .................................. 8/643; 6/638; 6/922
(58) Field of Classification Search ..................... None
See application file for complete search history.

(56) References Cited

U.S. PATENT DOCUMENTS 5,403,363 A 4/1995 Loeffler et al.

FOREIGN PATENT DOCUMENTS

| DE | 3643752 | 6/1988 |
|----|---------|--------|
| EP | 0601439 | 6/1994 |
| JP | 4173871 | 6/1992 |
| JP | 4173874 | 6/1992 |
| JP | 4173875 | 6/1992 |

*Primary Examiner*—Margaret Einsmann
(74) *Attorney, Agent, or Firm*—Connolly Bove Lodge & Hutz

(57) ABSTRACT

Disperse non-azo dyestuff mixture comprising:
a blue dye mixture comprising a compound of the following formula (1)

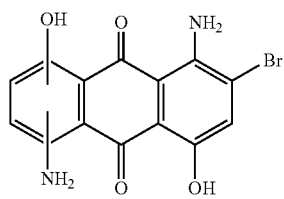

(1)

at least one compound of the following formula (2)

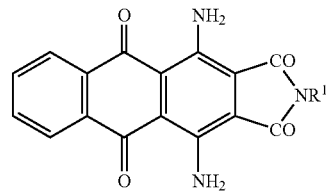

(2)

wherein
$R^1$ is $C_1$–$C_4$ alkyl such as methyl, ethyl n-propyl, isopropyl, n-butyl, isobutyl, sec-butyl or tert-butyl, 3-methoxypropyl, 3-ethoxypropyl and 3-methoxyethoxypropyl and a compound of the following formula (3)

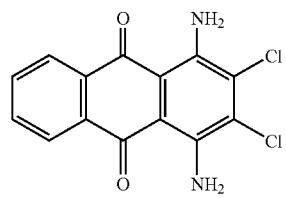

(3)

a yellow dyestuff mixture comprising a compound of the formula (4)

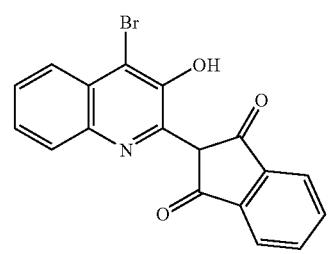

(4)

a compound of the following formula (5)

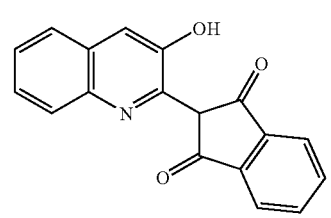

(5)

and compound of the following formula (6)

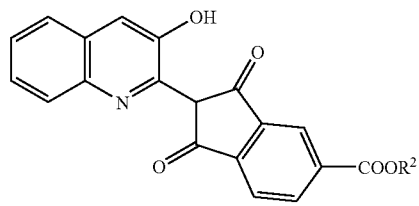

wherein $R^2$ is methyl and ethyl; and a red dye mixture comprising a compound of the following formula (7)

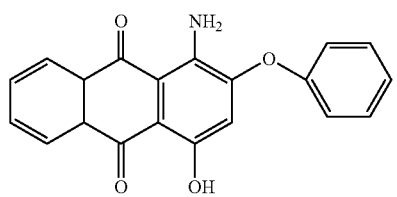

a compound of the following formula (8)

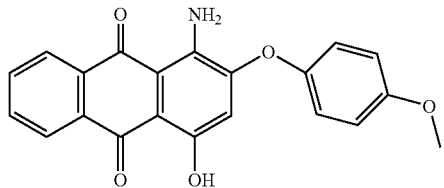

and a compound of the following formula (9)

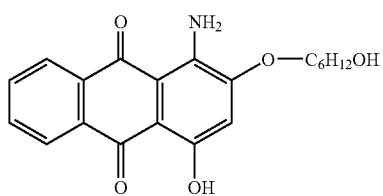

a method for the preparation of such mixtures and a method for coloring a synthetic textile material or fiber blend thereof using such mixtures.

11 Claims, No Drawings

DISPERSE DYE MIXTURES

This application claims benefit to U.S. provisional application No. 60/470,314 filed May 14, 2003.

This invention relates to mixtures of disperse non-azo dyes.

Dyeing of different denier polyester fibre products comprising fine denier polyester fibres such as from 0.1 denier to 0.7 denier and regular denier polyester fibres of for example from 1 denier to 5 denier is carried out usually by conventional dyeing methods with known disperse dyes. However, due to the difference in the specific surface area of the constituting fibres, the different denier polyester fibre products show certain application defects, such as for example relatively poor levelling or migration properties, an overly large dependence of the colour yield on varying dyeing parameters in the dyeing process or an insufficient colour build-up on polyester, or unsatisfactory fastness properties.

The efforts of widening or supplementing the ranges of dyes by means of modern disperse dyes reach, in many respects, limits which can be overcome only insufficiently, if at all, by means of an individual dye component.

A requirement of the use of dyes in a mixture is that the dyes exhibit the same dyeing behaviour. Moreover, the dyeing behaviour of dyes should remain constant during the entire dyeing process to ensure that the same hues are obtained not only at the beginning of the dyeing process.

Rather definite hues can only be obtained by using mixtures of definite different dyes according to the theory of subtractive colour mixing, where three dye shades having the ideal colours cyan, yellow and magenta (trichromatic dyeing) are necessary to produce all hues.

Thus there is a need for disperse dyestuff mixtures which provide dyeings of improved fastness properties and of an improved build up behaviour, on fine denier polyester fibres such as from 0.1 denier to 0.7 denier and regular denier polyester fibres of for example from 1 denier to 5 denier, especially in those cases in which it is desirable to produce definite hues.

According to the present invention, dye mixtures of non-azo disperse dyes of the formula (1) to (9) given and defined below have now been found which fulfil the requirements for use in trichromatic dyeing providing very even dyeings of very good light fastness properties on fine denier polyester fibres such as from 0.1 denier to 0.7 denier and regular denier polyester fibres of for example from 1 denier to 5 denier or synthetic textile materials and fibre blends thereof by exhaust dyeing and may be formed into dispersions for this purpose. An interesting feature of the inventive dyestuff mixtures is their good tone on tone shade performance between regular polyester and fine denier polyester during the dyeing process.

The invention accordingly provides disperse non-azo dyestuff mixtures comprising:

a blue dye mixture comprising a compound of the following formula (1)

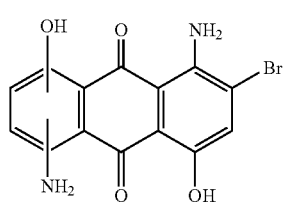

wherein the substituents in 5 and 8 position can be 5-hydroxy-8-amino- or 5-amino-8-hydroxy, respectively;

at least one compound of the following formula (2)

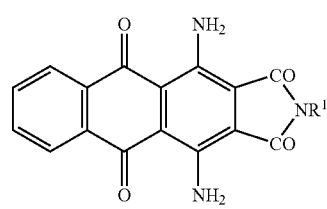

wherein $R^1$ is $C_1$–$C_4$ alkyl, 3-methoxypropyl, 3-ethoxypropyl and 3-methoxyethoxypropyl and a compound of the following formula (3)

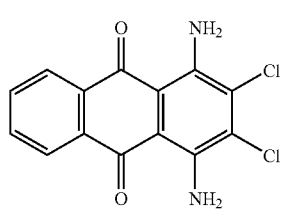

a yellow dyestuff mixture comprising a compound of the formula (4)

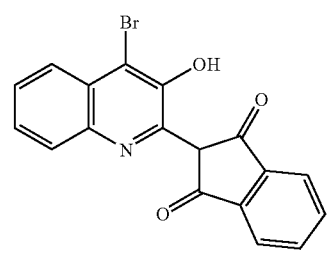

a compound of the following formula (5)

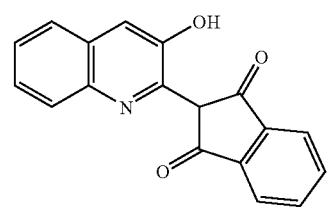

and compound of the following formula (6)

wherein $R^2$ is methyl and ethyl; and a red dye mixture comprising a compound of the following formula (7)

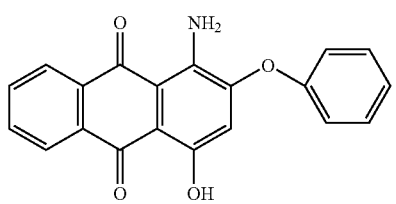

a compound of the following formula (8)

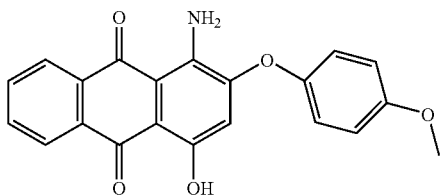

and a compound of the following formula (9)

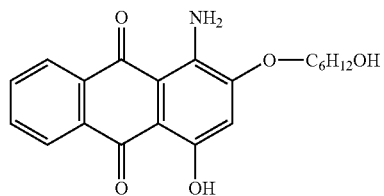

Alkyl $R^1$ may be straight-chain or branched and is in particular methyl, ethyl n-propyl, isopropyol, n-butyl, isobutyl, sec-butyl or tert-butyl. Methyl and ethyl are preferred.

The ratios of the dyestuffs (1) to (2) to (3) within the blue mixture are 40–80% by weight of compound of formula (1), 10–40% by weight of formula (2) and 10–30% by weight of formula (3). In preferred blue mixtures according to the invention the ratio of the dye of the formula (1) to the dye of the formula (2) to the dye of the formula (3) is 50–70% by weight of dyestuff (1) to 15–35% by weight of dyestuff (2) to 10–20% by weight of dyestuff (3).

These blue mixtures are new and are thus part of the invention.

The ratios of the dyestuffs (4) to (5) to (6) within the yellow mixture are 30–70% by weight of formula (4), 30–60% by weight of formula (5) and 10–40% by weight of formula (6). In preferred yellow mixtures according to the invention the ratio of the dye of the formula (4) to the dye of formula (5) to the dye of the formula (6) is 40–60% by weight to 30–50% by weight to 10–30% by weight.

In the red dye mixture, the ratios of the dyestuffs (7) to (8) to (9) are 20–60% by weight of formula (7) to 30–60% by weight of formula (8) to 10–50% by weight of formula (9), preferably 30–50% by weight of dyestuff (7) to 50–30% by weight of formula (8) to 10–40% by weight of formula (9).

If the ratio of dyestuffs of the formulae (1) to (2) to (3), or the ratio of dyestuffs of the formulae (4) to (5) to (6), or the ratio of dyestuffs of the formulae (7) to (8) to (9), is outside the above range, a colour difference between fibres in use will result, such being undesirable.

Dyestuff mixtures comprising dyestuffs of the formula (1) and (2) together with (7) und (8) are known from JP 04173871 and JP 04173874, dyestuff mixtures comprising dyestuffs of the formula (2) and (3) are known from DE 03643752 and EP 601439, dyestuff mixtures comprising dyestuffs (7) and (9) are known from JP 05861154 and JP 04173875.

The proportion of the blue dye mixture comprising dyestuffs of the formula (1) to (3) and yellow dye mixture comprising dyestuffs of the formula (4) to (6) and/or the red dye mixture comprising dyestuffs of the formula (7) to (9) are such that per 100 parts by weight of the blue dye mixture the yellow dye mixture is from 0.1 to 100,000 parts by weight, preferably from 1 to 10,000 parts by weight, and the red dye mixture is from 0.1 to 100,000 parts by weight, preferably from 1 to 10,000 parts by weight. The proportion is suitably selected within these ranges to obtain a desired colour.

Mixtures embodying the invention can be prepared, for example, by mixing the dye components in the required amounts. Suitable mixing methods include Co-Crystallisation Typically, the dyes are dissolved in a hot solvent, for example, by placing the dyes in a suitable solvent and heating up to the reflux temperature of the solvent until the dyes are dissolved, thereafter filtering to provide a solution, and then allowing the solution to cool and crystals to form. The resultant mixture may then undergo further processing, such as milling and spray drying. Examples of suitable solvents for this process are organic solvents such as aromatic hydrocarbons, chlorinated hydrocarbons, aliphatic hydrocarbons, alicyclic hydrocarbons, alcohols, amides, sulphoxides, esters, ketones and ethers. Specific examples of organic solvents are toluene, ethyl cellosolve, acetone, chlorobenzene, pyridine, dimethyl formamide, dimethylsulphoxide, ethyl acetate, benzene, tetrahydrofuran and cyclohexane.

Co-Milling (a) The dyes are mixed and then milled together to give an intimate blend which is then spray dried to give a solid mixture; or
(b) each dye is milled separately and then mixed in the required ratio before spray drying.

Dry Blending

Each dye is spray dried separately and then mixed in the required ratio by a dry blending process.

Mixtures embodying the invention provide especially useful disperse dyes valuable for colouring fine denier polyester fibres such as from 0.1 denier to 0.7 denier and regular denier polyester fibres of for example from 1 denier to 5 denier, or synthetic textile materials and fibre blends thereof by exhaust dyeing, padding or printing, and may be formed into dispersions for this purpose. They may also be used in, for example, ink jet printing of textiles and non-textiles, dye diffusion, thermal transfer printing and in the colouration of plastics.

A particular aspect of the invention provides a composition comprising a mixture of dyes (1) to (9) and additionally, at least one further ingredient conventionally used in colouring applications such as a dispersing agent and optionally a surfactant or wetting agent. The composition typically comprises from 1% to 65%, preferably 10 to 60%, more preferably 20 to 55%, of the total dye mixture in a solid medium.

Typical examples of dispersing agent are lignosulphonates, naphthalene sulphonic acid/formaldehyde condensates and phenol/cresol/sulphanilic acid/formaldehyde condensates, typical examples of wetting agent are alkyl aryl ethoxylates which may be sulphonated or phosphated and typical example of other ingredients which may be present are inorganic salts, de-foamers such as mineral oil or nonanol, organic liquids and buffers. Dispersing agents may be present at from 10% to 200% on the weight of the dye mixtures. Wetting agents may be used at from 0% to 20% on the weight of the dye mixtures.

The compositions may be prepared by bead milling the dye mixture with glass beads or sand in an aqueous medium. The compositions may have further additions of dispersing agents, fillers and other surfactants and may be dried, by a technique such as spray drying, to give a solid composition comprising from 5% to 65% of dyestuff.

According to another aspect, the invention provides a process for colouring a synthetic textile material or fibre blend thereof which comprises applying to the synthetic textile material or fibre blend a mixture comprising a dye of the formula (1) to (9).

The synthetic textile material may be selected from aromatic polyester, especially polyethylene terephthalate, polyamide, especially polyhexamethylene adipamide, secondary cellulose acetate, cellulose triacetate, and natural textile materials, especially cellulosic materials and wool. An especially preferred textile material is an aromatic polyester or fibre blend thereof with fibres of any of the above mentioned textile materials. Especially preferred fibre blends include those of polyester-cellulose, such as polyester-cotton, and polyester-wool. The textile materials or blends thereof may be in the form of filaments, loose fibres, yarn or woven or knitted fabrics.

The mixtures of dyes of formulae (1) to (9) may be applied to the synthetic textile materials or fibre blends by processes which are conventionally employed in applying disperse dyes to such materials and fibre blends.

Suitable process conditions may be selected from the following (I) exhaust dyeing at a pH of from 4 to 9.5, at a temperature of from 100° C. to 140° C. for from 10 to 120 minutes and under a pressure of from 1 to 2 bar, a sequestrant optionally being added;
(II) continuous dyeing at a pH of from 4 to 6.5, at a temperature of from 190° C. to 225° C. for from 15 seconds to 5 minutes, a migration inhibitor optionally being added;
(III) carrier dyeing at a pH of from 4 to 9.5, at a temperature of from 95° C. to 100° C. using a carrier such as methylnaphthalene, diphenylamine or 2phenylphenol, sequestrants optionally being added; and
(IV) atmospheric dyeing of acetate, triacetate and nylon at a pH of from 4 to 9.5, at a temperature of 85° C. for acetate or at a temperature of 90° C. for triacetate and nylon for from 15 to 90 minutes, sequestrants optionally being added.

In all the above processes, the dye mixture is applied as a dispersion comprising from 0.001% to 20%, preferably from 0.05 to 16%, of the dye mixture in an aqueous medium.

The dye mixtures may also be applied to textile materials using supercritical carbon dioxide, in which case the dye formulating agents may optionally be omitted.

Embodiments of the present invention will now be described in more detail with reference to the following examples, in which parts are by weight unless otherwise stated. Using 2 denier polyester as the standard, the relative value of the CMC colour difference (DE) of 0.5 denier polyester fabric was measured, and the degree of tone on tone dyeing was evaluated. The light fastness was measured in accordance with ISO 105-B02:1999 (Xenon-arc lamp test, evaluated by blue scale).

EXAMPLE 1

A blue dye mixture comprising 16.4 parts of dye of formula (1) and 5.7 parts of formula (3) and 10.6 parts of dyestuffs according to formula (2–1) was prepared by mixing the three dyes together and milling them as a 40% aqueous slurry with 20 parts of a high temperature stable dispersing agent until the dye particle size (mean diameter) was in the range 0.1–5 microns.

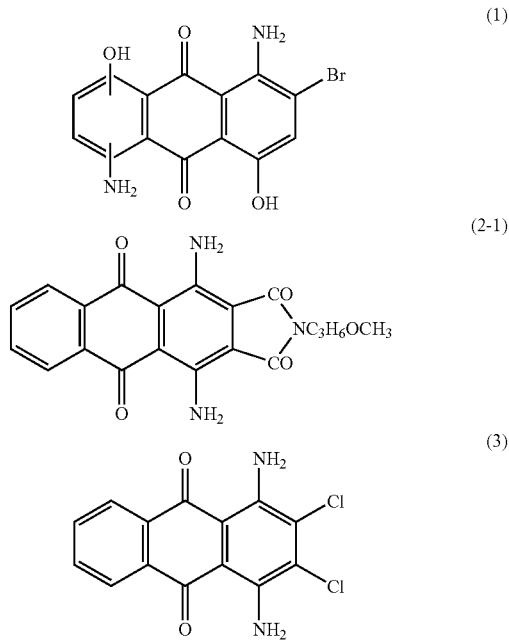

This dispersion was standardised to a solid brand containing 32.7% of the mixture and 67.3% dispersing agent, by the addition of 47.3 parts of a temperature stable dispersing agent and drying to either a grain or powder form in a spray dryer.

A yellow dye mixture comprising 5.9 parts of dye formula (4) and 4.4 parts of dye of formula (5) and 2.6 parts of dye according to formula (6-1) was prepared by mixing the three dyes together and milling them as 40% slurry with 20 parts of a high temperature stable dispersing agent until the dye particle size (mean diameter) was in the range 0.1–5 microns.

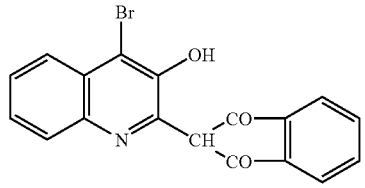
(4)

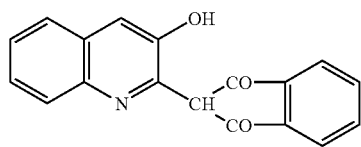
(5)

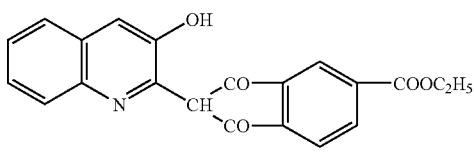
(6-1)

This dispersion was standardised to a solid brand containing 12.9% of the dyestuff mixture and 87.1% of dispersing agent, by the addition of 67.1 parts of a temperature stable dispersing agent and drying to either a grain or powder form in a spray dryer.

A red dye mixture comprising 8.0 parts of dye of (formula (7), 8.5 parts of dye of formula (8) and 10.5 parts of dye of formula (9) was prepared by mixing the three dyes together and milling them as a 40% aqueous slurry with 20 parts of a high temperature stable dispersing agent until the dye particle size (mean diameter) was in the range 0.1–5 microns.

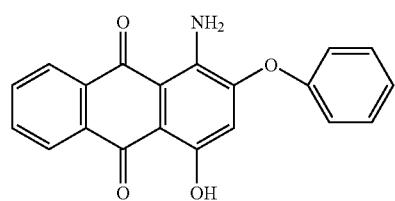
(7)

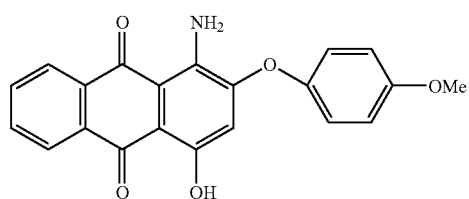
(8)

-continued

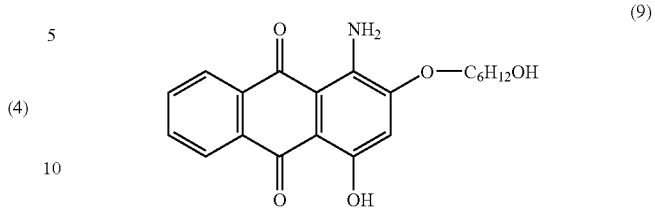
(9)

This dispersion was standardised to a solid brand containing 27% of the mixture and 73% dispersing agent, by the addition of 53 parts of a temperature stable dispersing agent and drying to either a grain or powder form in a spray dryer.

A dye bath for the exhaust dyeing of polyester in piece form was prepared by adding 1.5 ml of an aqueous dispersion of the blue dye mixture (1 g blue dye in 100 ml water at 40–50° C.) and 1.5 ml of an aqueous dispersion of the yellow dye mixture (1 g yellow dye in 100 ml water at 40–50° C.) and 1.5 ml of an aqueous dispersion of the red dye mixture (1 g red dye in 100 ml water at 40–50° C.) to 57 ml of deionised water and 1.2 ml of buffer solution. To this dye bath was added a 2.5 g piece of regular denier polyester and a 2.5 g piece of fine denier polyester and the dye bath was held for 30 minutes at 120° C. in a high temperature dyeing machine. After rinsing the dyed material with water and a subsequent reduction cleaning treatment, each material was dyed grey shade with excellent light fastness.

EXAMPLE 2

The preparation of dye mixtures, the dyeing and evaluation were conducted in the same manner as given in example 1 except that the recipe was changed as follows:

The blue dye mixture comprising 18.2 parts of dye of formula (1), 5.1 parts of dye of formula (3) and 8.0 parts of dye of formula (2-1)

a yellow dye mixture comprising 5.9 parts of dye of formula (4), 5.0 parts of dye of formula (5) and 2.0 parts of dye formula (6-1) and a red dye mixture comprising 9.1 parts of dye of formula (7) and 8.45 parts of dye of formula (8) and 9.0 parts of dye of formula (9). The results are given in table 1.

EXAMPLE 3

The preparation of dye mixtures, the dyeing and evaluation were conducted in the same manner as given in example 1 except that the recipe was changed as follows:

The blue dye mixture comprising 13.0 parts of dye of formula (I), 6.5 parts of (2-1), 8.4 parts of dye of the formula (3) and 6.5 parts of dye of formula (2-2)

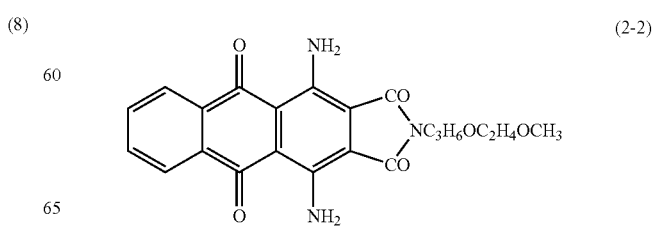
(2-2)

and a yellow dye mixture comprising 4.6 parts of dye of formula (4), 5.7 parts of dye of formula (5) and 2.6 parts of dye formula (6-1) and
a red dye mixture comprising 7.0 parts of dye of formula (7) and 14.0 parts of dye of formula (8) and 7.0 parts of dye of formula (9). The results are given in table 1.

COMPARATIVE EXAMPLE 1

The preparation of dye mixtures, the dyeing and evaluation were conducted in the same manner as given in example 1 except that the recipe was changed as follows:
26.0 parts of the blue dye of formula (I), 13.1 parts of the yellow dye of formula (4) and 23.0 parts of the red dye of formula (7).

TABLE 1

| | Colour difference (DE) between fibers in use | Light fastness fine denier side | Light fastness regular denier side |
|---|---|---|---|
| Example 1 | 2.5 | 5 | 5–6 |
| Example 2 | 2.7 | 5 | 5–6 |
| Example 3 | 2.7 | 5 | 5–6 |
| Comparative Example | 3.4 | 3–4 (redden) | 4–5 (redden) |

As is shown in table 1, the differences of DE of Example 1 to 3 are less than that of the comparative example, which means the disperse dye composition of the present invention is capable of presenting an excellent dyed product with an excellent light fastness as well as an excellent tone on tone colour between fibres in use even when used for a difference denier fibre product.

The invention claimed is:
1. Disperse non-azo dyestuff mixture comprising:
a blue dye mixture comprising a compound of the following formula (1)

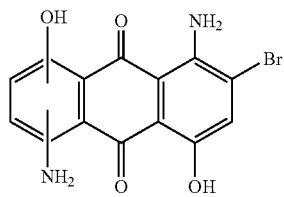
(1)

at least one compound of the following formula (2)

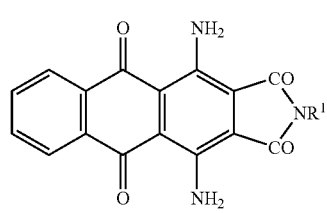
(2)

wherein
R$^1$ is C$_1$–C$_4$ alkyl selected from methyl, ethyl, n-propyl, isopropyl, n-butyl, isobutyl, sec-butyl or tert-butyl, 3-methoxypropyl, 3-ethoxypropyl or 3-methoxyethoxypropyl
and a compound of the following formula (3)

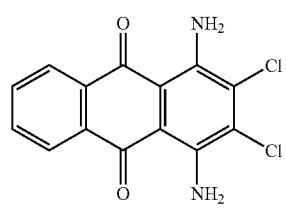
(3)

a yellow dyestuff mixture comprising a compound of the formula (4)

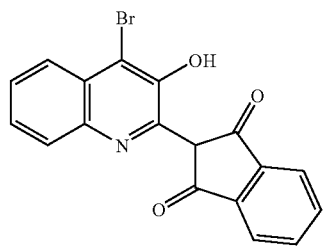
(4)

a compound of the following formula (5)

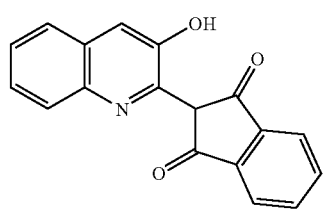
(5)

and compound of the following formula (6)

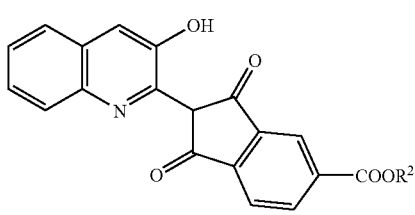
(6)

wherein R$^2$ is methyl and ethyl;
and a red dye mixture comprising a compound of the following formula (7)

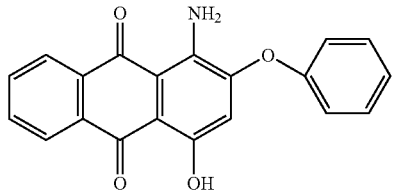

a compound of the following formula (8)

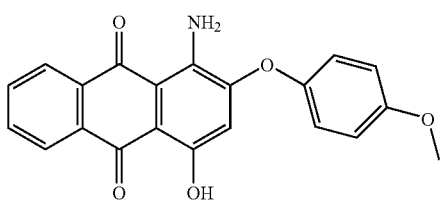

and a compound of the following formula (9)

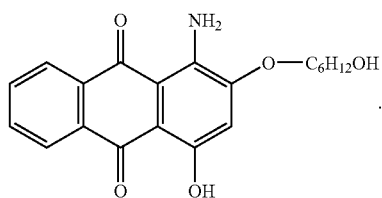

2. Blue dye mixture comprising 40–80% by weight of a compound of the following formula (1)

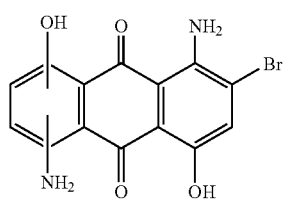

and 10–40% by weight of at least one compound of the following formula (2)

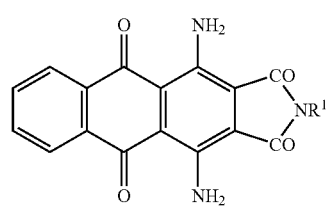

10–30% by weight of a compound of the following formula (3)

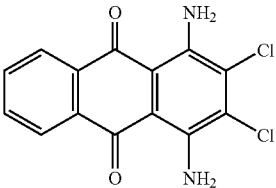

wherein $R^1$ is $C_1$–$C_4$ alkyl, 3-methoxypropyl, 3-ethoxypropyl or 3-methoxyethoxypropyl.

3. Disperse dye mixture according to claim 1 wherein the ratios of the dyestuffs (1) to (2) to (3) within the blue mixture are 40–80% by weight of compound of formula (1), 10–40% by weight of formula (2) and 10–30% by weight of formula (3), the ratios of the dyestuffs (4) to (5) to (6) within the yellow mixture are 30–70% by weight of formula (4), 30–60% by weight of formula (5) and 10–40% by weight of formula (6) and in the red dye mixture, the ratios of the dyestuffs (7) to (8) to (9) are 20–60% by weight of formula (7) to 30–60% by weight of formula (8) to 10–50% by weight of formula (9).

4. Disperse dye mixtures according to claim 1 wherein the ratio of the dyes (1) to (2) to (3) in the blue mixture are 50 to 70% by weight of dyestuff (1) to 15–35% by weight of dyestuff (2) to 10–20% by weight of dyestuff (3), in yellow mixtures according to the invention the ratio of the dye of the formula (4) to the dye of formula (5) to the dye of the formula (6) is 40–60% by weight of (4) to 30–50% by weight of (5) to 10–30% by weight of (6) and in the red mixtures the ratios of the dyestuffs of the formulae (7) to (8) to (9) are 30–50% by weight of dyestuff (7) to 30–50% by weight of formula (8) to 10–40% by weight of formula (9).

5. Dyestuff mixture according to claim 1 wherein the proportion of the blue dye mixture comprising dyestuffs of the formula (1) to (3) and yellow dye mixture comprising dyestuffs of the formula (4) to (6) and the red dye mixture comprising dyestuffs of the formula (7) to (9) are such that per 100 parts by weight of the blue dye mixture the yellow dye mixture is from 0.1 to 100,000 parts by weight and the red dye mixture is from 0.1 to 100,000 parts by weight.

6. Process for the preparation of a dye mixture according to claim 1 comprising mixing the dye components.

7. A composition comprising a dye mixture according to claim 1 and at least one dispersing agent, surfactant or wetting agent.

8. A process for coloring a synthetic textile material or fibre blend thereof, which comprises applying thereto a dye mixture according to claim 1 by exhaust dyeing.

9. A process according to claim 8, wherein the synthetic material or fibre blend thereof is a fine denier polyester fibre, or a regular denier polyester fibre or synthetic textile materials or fibre blends thereof.

10. Dyestuff mixture according to claim 1 wherein the proportion of the blue dye mixture comprising dyestuffs of the formula (1) to (3) and yellow dye mixture comprising dyestuffs of the formula (4) to (6) and the red dye mixture comprising dyestuffs of the formula (7) to (9) are such that per 100 parts by weight of the blue dye mixture the yellow dye mixture is from 1 to 10,000 parts by weight and the red dye mixture is from 1 to 10,000 parts by weight.

11. A process according to claim 8, wherein the synthetic material or fibre blend thereof is a fine denier polyester fibre which has a denier from 0.1 denier to 0.7 denier, or a regular denier polyester fibre which has a denier from 1 denier to 5 denier or synthetic textile materials or fibre blends thereof.

* * * * *

UNITED STATES PATENT AND TRADEMARK OFFICE
CERTIFICATE OF CORRECTION

| | |
|---|---|
| PATENT NO. | : 7,101,408 B2 |
| APPLICATION NO. | : 10/834428 |
| DATED | : September 5, 2006 |
| INVENTOR(S) | : Kiyoshi Himeno et al. |

It is certified that error appears in the above-identified patent and that said Letters Patent is hereby corrected as shown below:

In the Claims;

Column 12, line 1, "10-30% by weight of a compound of the following" should read -- and 10-30% by weight of a compound of the following --

Signed and Sealed this

Twenty-third Day of January, 2007

JON W. DUDAS
*Director of the United States Patent and Trademark Office*